Figure 1:
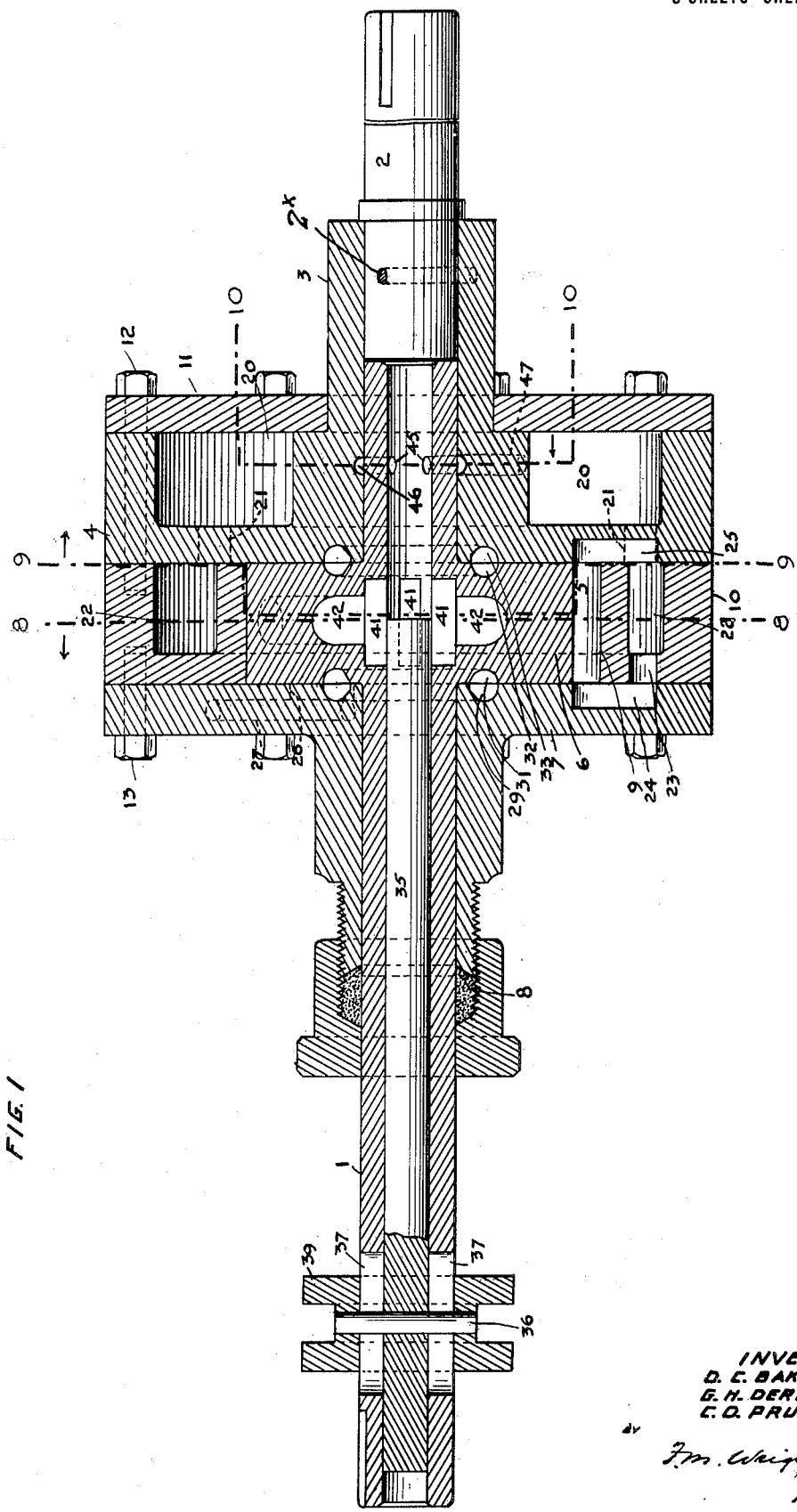

D. C. BAKER, G. H. DERRICK AND C. D. PRUITT.
FLUID POWER TRANSMISSION.
APPLICATION FILED SEPT. 6, 1916.

1,317,415.

Patented Sept. 30, 1919.
3 SHEETS—SHEET 1.

INVENTORS
D. C. BAKER
G. H. DERRICK
C. D. PRUITT by F. M. Wright,
ATTY.

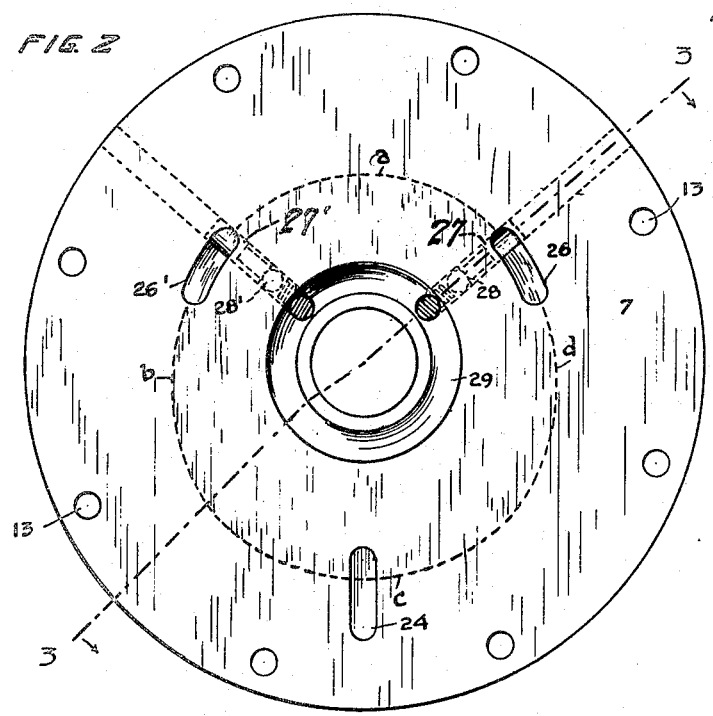
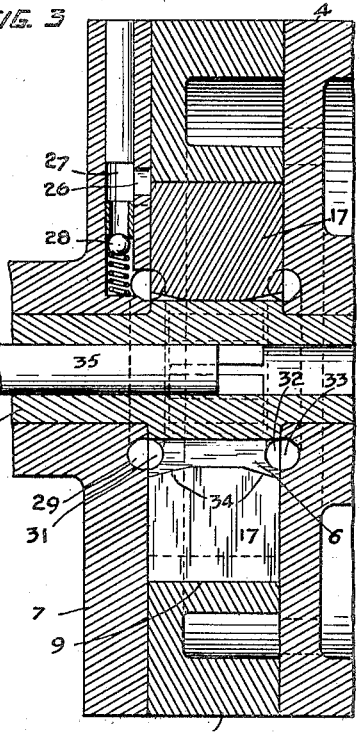
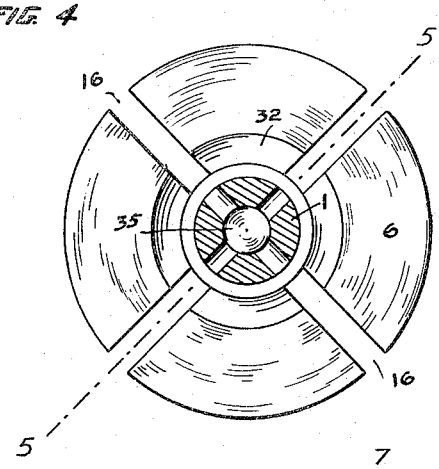
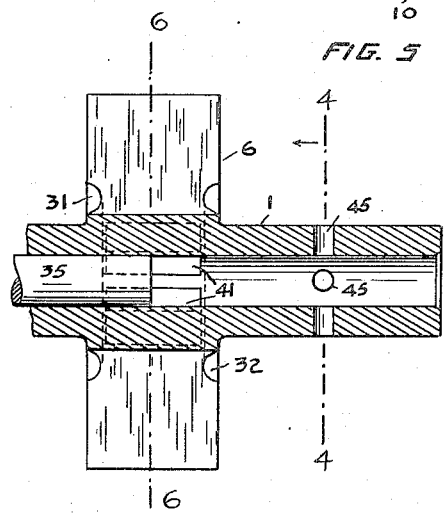
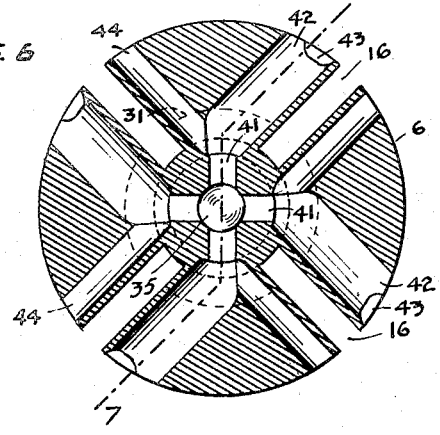
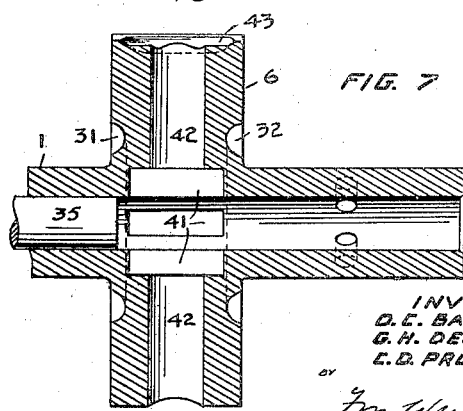

D. C. BAKER, G. H. DERRICK AND C. D. PRUITT.
FLUID POWER TRANSMISSION.
APPLICATION FILED SEPT. 6, 1916.
1,317,415.
Patented Sept. 30, 1919.
3 SHEETS—SHEET 3.
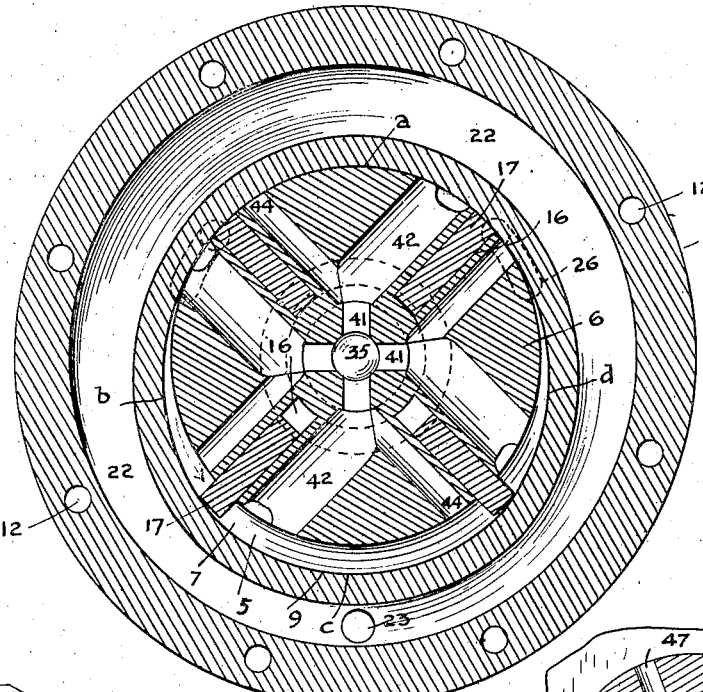
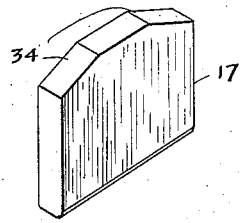
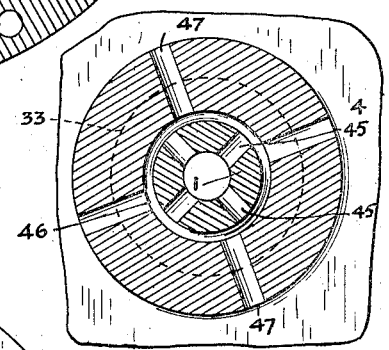
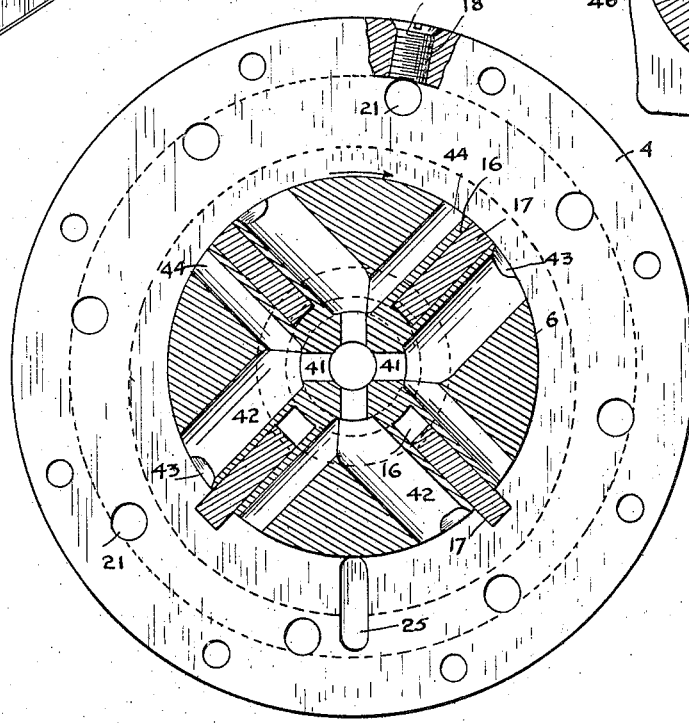
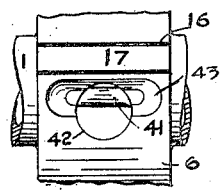
INVENTORS
D. C. BAKER
G. H. DERRICK
C. D. PRUITT
ATT'Y

UNITED STATES PATENT OFFICE.

DEXTER C. BAKER AND GEORGE H. DERRICK, OF OAKLAND, AND CONRAD D. PRUITT, OF SAN FRANCISCO, CALIFORNIA; SAID DEXTER C. BAKER ASSIGNOR OF HIS RIGHT TO JAY ERWIN BAKER, OF OAKLAND, CALIFORNIA.

FLUID-POWER TRANSMISSION.

1,317,415.  Specification of Letters Patent.  Patented Sept. 30, 1919.

Application filed September 6, 1916. Serial No. 118,628.

*To all whom it may concern:*

Be it known that we, DEXTER C. BAKER and GEORGE H. DERRICK, citizens of the United States, residing at Oakland, in the county of Alameda and State of California, and CONRAD D. PRUITT, a citizen of the United States, residing at San Francisco, in the county of San Francisco and State of California, have invented new and useful Improvements in Fluid-Power Transmission, of which the following is a specification.

The object of the present invention is to provide an improved means for transmitting power from one shaft to another through the medium of a fluid, and especially of a liquid, which will be very effective in its action because of freedom from leakage of the liquid, which can be used to transmit power at the same speed of rotation as the power shaft, or at any less speed desired, and which will be reversible, that is, in which either of the above shafts can be used as the power shaft and the other as the working shaft.

In the accompanying drawings, Figure 1 is a broken longitudinal central section of the improved transmission, certain parts being shown in side elevation; Fig. 2 is a side view of the front head of a rotor chamber removed; Fig. 3 is a broken longitudinal central section of the device taken on the line 3—3 of Fig. 2; Fig. 4 is a transverse section through a power shaft, taken on the line 4—4 of Fig. 5, showing a rotor thereon in side elevation; Fig. 5 is a longitudinal central section through the power shaft and rotor taken on the line 5—5 of Fig. 4; Fig. 6 is a transverse section through the power shaft and rotor taken on the line 6—6 of Fig. 5; Fig. 7 is a longitudinal central section taken on the line 7—7 of Fig. 6; Fig. 8 is a transverse section of the transmission taken on the line 8—8 of Fig. 1; Fig. 9 is a transverse section thereof on the line 9—9 of Fig. 1, looking in the opposite direction to that of Fig. 8, and thus showing a rear wall in front elevation, a portion of the latter being broken away; Fig. 10 is a cross section on the line 10—10 of Fig. 1; Fig. 11 is a perspective view of a blade; Fig. 12 is a broken plan view of a power shaft and a rotor carried thereby.

Referring to the drawing, 1 indicates a tubular power shaft and 2 indicates a working shaft. To the forward end of the shaft 2 is secured by a pin 2' the rear portion of a hollow hub 3, the front portion of which receives the rear end of the power shaft, and carries the rear wall 4 of a rotor chamber 5. A rear portion of the power shaft carries a cylindrical rotor 6, which rotates in said rotor chamber 5. Said chamber 5 has a front wall 7, provided with a stuffing box 8 around the power shaft 1, and is also bounded by a circumferential wall 9 eccentric to the rotor and formed eccentrically in a rotor casing 10 coaxial with the rotor. Said casing 10 and rear wall 4 are secured together and to a rear disk 11 by screws 12, and the casing 10 is secured by screws 13 to the front wall 7.

Said rotor is divided into four equal sectors by guideways 16, (Figs. 4, 5) which have parallel sides extending approximately radially from the axis of the rotor, and in which can slide blades 17, (Figs. 9, 10, 11) having straight outer edges to move in contact with the circumferential wall 9 of the rotor chamber 5. The inner surface of said wall 9, indicated in dotted lines in Fig. 2, is composed of four curved surfaces. One curved surface $a$ is cylindrical, extends through 90°, and has the same axis and radius as the rotor, so that this entire surface $a$ is always in contact with the surface of the rotor and the outer edge of a blade carried thereby, and pressed outward as hereinafter described, and may be termed the head of the rotor chamber. The opposite curved surface $c$ is also cylindrical and coaxial with the rotor, and extends through 90°, but has a radius greater than the radius of the rotor. The intermediate surfaces $b$, $d$ are cylindrical, and their ends are coplanar respectively with the adjacent ends of the first-named surfaces.

Oil or other suitable liquid is supplied to the interior of the casing through a hole 18 in the rear wall 4, which hole is afterward closed by a plug 19. The oil flows into a recess 20 in the rear side of the rear wall 4, which recess 20 is closed at the rear by the disk 11 and forms an annular reservoir, thence, by means of holes 21 through the wall 4, into an annular recess 22 in the rear side of the rotor casing 10, forming a supply chamber, and thence, through a hole 23 in the rotor casing and through radially elongated ports 24, 25, in the front and rear walls 7 and 4, into the rotor chamber 5, the outer end of the front port 24 registering with said hole 23 and thus communicating with the annular recess 22.

When the rotor rotates, the liquid in that section of the rotor chamber which is next to, and behind, the head, and which is contracting and may be termed the working section of said chamber, is compressed between the surface $d$, the rotor surface, and the blades adjacent thereto, and forms a lock between said blades and surfaces, and compels the rotor casing to rotate with the rotor, and thus imparts to the working shaft rotation at the same speed as the power shaft.

To prevent leakage past the blades 17, they are pressed outward in the following manner by the pressure of that portion of the liquid which is so compressed and locked: Formed in the rear side of the wall 7, and at the junctures of the surfaces $d$ and $a$, is a circumferentially elongated recess 26, which is of greater length than the thickness of each blade, so that it is always in communication with the working section of the rotor chamber, on one side or the other of an adjacent blade. Said recess communicates with the outer end of a passage 27 extending radially in the front wall 7, in which is an inwardly opening spring-closed check valve 28, the necessity for which will hereinafter appear, and the inner end of which passage opens out of said wall rearwardly and communicates with an annular channel formed by two annular grooves 29, 31, respectively in the front wall 7 and the front rear side of the rotor 6, said latter groove 31 communicating with the front portions of the inner ends of guideways 16. The rear portions of said inner ends also communicate with a similar annular channel formed by two annular grooves 32, 33, respectively in the rear side of the rotor 6 and in the front side of the rear wall 4. Therefore the outward pressure on each blade 17 is the same at both ends of the inner edge of the blade. In order to permit the liquid to freely enter the spaces at the backs of the blades, their inner edges are made with beveled terminal portions 34.

It is desirable to provide means whereby the transmission can be used when the engine is employed as a brake to retard the motion of the working shaft, as, for instance, when an automobile, in which the transmission is used, is descending a steep hill. In that case the working shaft tends to rotate faster than the rotor shaft, and the latter is driven by the former. Such being the case, the working section of the rotor chamber is no longer behind the head of the rotor chamber, but is in front of it, and consequently there is no longer any pressure in what was formerly the working section which can be transmitted to the inner edges of the blades to maintain their outer edges pressed against the surface of the rotor chamber. Therefore, to provide this necessary pressure, there is employed a circumferentially elongated recess 26', in the rear side of the wall 7, in communication with a radially extending passage 27' in said wall 7, in which is an inwardly opening spring-closed check valve 28', the inner end of which passage communicates with the groove 29. The passage 27' is 90° in advance of the passage 27, and performs the same office for the section of the rotor chamber which is adjacent to the surface $b$, when the engine is serving as a brake, as the passage 27 does for the section adjacent to the surface $d$ when the engine shaft is driving the working shaft.

It is now seen why it is necessary to provide the check valve 28 in the passage 27 and also the check valve 28' in the passage 27', for, without these check valves, the liquid would escape from one side of the head of the rotor chamber to the other, and would not be under the pressure necessary to maintain the outer edges of the blades in contact with the surface of the rotor chamber.

To permit the working shaft to be rotated at a slower speed than the power shaft, there is provided a piston valve 35, slidable in the hollow power shaft 1, and through the front end of which is driven a pin 36, which can slide in diametrically opposite slots 37 in the power shaft, and is also driven through a grooved collar 39, which can be slid longitudinally on the power shaft 1 by any desired means. In order that the working shaft may rotate at full speed, said piston valve is made to close slots 41 in the hollow shaft opposite to inner ends of outwardly extending ports 42 in the rotor sections. But, when it is desired to rotate the working shaft at a slower speed than the driving shaft, said piston valve is withdrawn, so that, instead of the liquid being wholly confined or locked in the working section of the rotor chamber, a portion of said liquid can escape through the adjacent port 42 and slot 41, the hollow shaft, and out through the diametrically opposite slot 41 and port 42, into the opposite section of the rotor chamber adjacent to the surface $b$, which is then able to receive it because the latter section is then expanding. Upon the size of the openings through the slots 41 exposed by the withdrawal of the piston valve will depend the ratio of the amount of liquid which thus escapes through the hollow shaft to that which is driving the working shaft, and will therefore depend the ratio of the speed of the working shaft to that of the driving shaft. To facilitate the passage of the liquid into the ports 42, their outer ends open into troughs or recesses 43 extending transversely in the surfaces of the rotor sections.

It will be observed that the ports 42 are located at the extreme rear ends of the rotor sections. This is necessary in order that the liquid may escape from the working chamber at any position of the rear blade therein, and until said rear blade passes out of the working section of the rotor chamber and comes into contact with the surface $a$ of the wall 9, when the surface of the next section of the rotor and the next blade form walls of the working section of the rotor chamber. If the port 42 were located in the front part of the rotor section, then when the outer end of said port came in contact with the surface $a$, the liquid could no longer escape from the working section of the rotor chamber through said port 42, which would then be closed by the surface $a$.

But, when, as before explained, the working shaft is driving the rotor shaft, but not at full speed, then the rotor casing has a rotation relative to the rotor in the same direction as before, and the section of the rotor chamber, which is in front of the head of the rotor chamber instead of behind it, is contracting and is now the working chamber. In this case, were suitable provision not made, the port 42 would be cut off from the rest of said working section, by its outer end being closed by the surface $a$, or the head of the working chamber. In that case the liquid would be completely confined in said working section, and it would not be possible for the rotor to rotate otherwise than at the same speed as the working shaft. There is therefore provided a port 44 leading inwardly from the front end of each section of the rotor, and communicating with the port 42 leading from the rear end of said section. The port 44 leading from said working section enables part of the liquid to escape through the hollow shaft when the working shaft is moving faster than the rotor shaft.

When less than the full speed of rotation is transmitted from the power shaft to the working shaft, that is to say, when the rotor is rotating relatively to the rotor casing, the vacuum caused by the passage of a section of the rotor from the surface $a$ of the wall 9, with which it is in contact, to proximity with the surface $b$ of the wall 9, from which it is spaced, while at the same time the blade in front of said rotor section is maintained tightly pressed against the wall 9, is filled by fluid flowing through the adjacent port 42 or 44.

It is not permissible to entirely fill the interior of the casing with liquid, otherwise the expansion of the liquid would create a pressure against which it would be practically impossible to press the piston valve 35 to close said valve. It is found desirable to fill it about two-thirds full of liquid. Unless proper provision were made, the result of the casing being filled partly with oil and partly with air or gas would be that the rotor would be transmitting power to the working shaft by means of a compressible fluid at one time, and an incompressible fluid at another time. When the rotor started to transmit power by means of an unyielding instead of a yielding fluid, there would be produced a knocking sound and an uneven action of the machine. To avoid this result, provision is made for allowing the air or gas to escape from the rotor chamber. Since air or gas, being lighter than liquid, always moves toward the center of rotation of a rotating vessel in which both are confined, the air or gas flows from the rotor chamber into the hollow shaft, and an escape is provided by means of radially extending holes 45 in the hollow power shaft 1 near its rear ends, and opening into a channel 46, from which channel holes 47 lead outwardly and discharge into the reservoir. These holes allow the confined air or gas to escape through the hollow shaft into the reservoir. When the device is rotating, the oil is thrown by centrifugal force to the outside of said reservoir and is therefore always, as is necessary, in communication with the holes 21, and the air is confined in the central portion of the reservoir.

The air thus confined forms a cushion which renders elastic the pressure which presses the blades outwardly, thus preventing unevenness in the operation of the blades which would result from faulty workmanship, as in not properly shaping the wall 9 of the rotor chamber.

It will be seen from the above description that the transmission is reversible, that is, that either of the shafts 1 and 2 can be used as a power shaft, the other then being the working shaft.

We claim:—

1. In a fluid transmission device, the combination of two shafts, a casing secured to one of said shafts and having a rotor chamber therein, a rotor secured to the other shaft and rotating in said chamber, said rotor having outwardly extending guideways, blades slidable in said guideways, said rotor chamber having a circumferential wall against which the outer ends of the blades can press in the rotation of the rotor, and having a portion of its surface extending circumferentially through approximately 90° in contact with the rotor, means for transmitting the pressure of fluid confined in the chamber between said contacting portion and the next succeeding blade behind it to the inner end of said blade to press it outwardly against said wall, and means for controlling the circulation of the fluid.

2. In a fluid transmission device, the combination of two shafts, a casing secured to one of said shafts and having a rotor chamber therein, a rotor secured to the other shaft and rotating in said chamber, said rotor having outwardly extending guideways, blades slidable in said guideways, said rotor chamber having a circumferential wall against which the blades can press in the rotation of the rotor, and having a portion of its surface in contact with the rotor, means for transmitting the pressure of fluid confined in the chamber between said contacting portion and the next succeeding blade behind it to the inner end of said blade to press it outwardly against said wall, said means comprising two annular grooves, in the casing and rotor respectively, registering with each other to form an annular channel, and means for controlling the circulation of the fluid.

3. In a fluid transmission device, the combination of two shafts, a casing secured to one of said shafts and having a rotor chamber therein, a rotor secured to the other shaft and rotating in said chamber, said rotor having outwardly extending guideways, blades slidable in said guide-ways, said rotor chamber having a circumferential wall against which the blades can press in the rotation of the rotor, said wall comprising four substantially quadrantal sections, two of said sections being coaxial and one of them being in contact through its whole extent with the rotor and a blade carried thereby, means for transmitting the pressure of fluid confined in the chamber between said contacting portion and the next succeeding blade behind it to the inner end of said blade to press it outwardly against said wall, and means for controlling the circulation of the fluid.

4. In a fluid transmission device, the combination of two shafts, a casing secured to one of said shafts and having a rotor chamber therein, a rotor secured to the other shaft and rotating in said chamber, said rotor having outwardly extending guideways, blades slidable in said guideways, said rotor chamber having a circumferential wall against which the blades can press in the rotation of the rotor, and having a portion of its surface in contact with the rotor, means for transmitting the pressure of fluid confined in the chamber between said contacting portion and the next succeeding blade behind it to the inner end of said blade to press it outwardly against said wall, said means comprising a passage having an opening across which the blades travel in succession, said opening being of greater length circumferentially than the thickness of the blade, and means for controlling the circulation of the fluid.

5. In a fluid transmission device, the combination of two shafts, a casing secured to one of said shafts and having a rotor chamber therein, a rotor secured to the other shaft and rotating in said chamber, said rotor having outwardly extending guideways, blades slidable in said guideways, said rotor chamber having a circumferential wall against which the blades can press in the rotation of the rotor, and having a portion of its surface in contact with the rotor, means for transmitting the pressure of fluid confined in the chamber between said contacting portion and the next succeeding blade behind it to the inner end of said blade to press it outwardly against said wall, said means comprising an annular channel on each side of the rotor, and terminal portions of the inner ends of the blades being beveled to facilitate the passage of the fluid from one channel to the other, and means for controlling the circulation of the fluid.

6. In a fluid transmission device, the combination of two shafts, a casing secured to one of said shafts and having a rotor chamber therein, a rotor secured to the other shaft and rotating in said chamber, said rotor having outwardly extending guideways, blades slidable in said guideways, said rotor chamber having a circumferential wall with a cylindrical surface coaxial with, and having the same radius as, the rotor, and an adjacent curved surface, and means for transmitting fluid pressure from the juncture of said surfaces to the inner ends of said guide-ways, and means for controlling the circulation of fluid through the rotor chamber.

7. In a fluid transmission device, the combination of two shafts, a casing secured to one of said shafts and having a rotor chamber therein, a rotor secured to the other shaft and rotating in said chamber, said rotor having outwardly extending guideways, blades slidable in said guideways, said rotor chamber having a circumferential wall with a cylindrical surface coaxial with, and having the same radius as, the rotor, and opposite curved surfaces adjacent to the cylindrical surface, and individual means for transmitting fluid pressure from the junctures of the cylindrical and adjacent surfaces to the inner ends of said guideways, and means for controlling the circulation of fluid through the rotor chamber.

8. In a fluid transmission device, the combination of two shafts, a casing secured to one of said shafts and having a rotor chamber therein, a rotor secured to the other shaft and rotating in said chamber, said rotor having outwardly extending guideways, blades slidable in said guideways, said rotor chamber having a circumferential wall with two opposite cylindrical surfaces coaxial with the rotor, one of said surfaces having the same radius as the rotor, and intermediate curved surfaces continuous with the cylindrical surfaces, said casing having two ports communicating respectively with the junctures of the first-named surface with the adjacent curved surfaces and also with the inner ends of said guideways, and means for controlling the circulation of fluid through the rotor chamber.

9. In a fluid transmission device, the combination of two shafts, a casing secured to one of said shafts, and having a rotor chamber therein, a rotor secured to the other shaft and rotating in said chamber, said rotor having outwardly extending guideways, blades slidable in said guideways, said rotor chamber having a circumferential wall with two opposite cylindrical surfaces coaxial with the rotor, one of said surfaces having the same radius as the rotor, and intermediate curved surfaces continuous with the cylindrical surfaces, all of said surfaces being substantially quadrantal, and means for transmitting fluid pressure from the juncture of the first-named surfaces with said curved surfaces to the inner ends of said guideways, and means for controlling the circulation of fluid through the rotor chamber.

10. In a fluid transmission device, the combination of two shafts, a casing secured to one of said shafts and having a rotor chamber therein, a rotor secured to the other shaft and rotating in said chamber, said rotor having outwardly extending guideways, blades slidable in said guideways, said rotor chamber having a circumferential wall with a cylindrical surface wholly in contact with the rotor, and adjacent curved surfaces continuous with the first surface, and individual means for transmitting fluid pressure from the junctures of said cylindrical and curved surfaces to the inner ends of said guideways and check-valves for controlling said means, and means for controlling the circulation of fluid through the rotor chamber.

11. In a fluid transmission device, the combination of two shafts, a casing secured to one of said shafts and having a rotor chamber therein, a rotor secured to the other shaft and rotating in said chamber, said rotor having outwardly extending guideways, blades slidable in said guideways, said rotor chamber having a circumferential wall with a cylindrical surface wholly in contact with the rotor, and adjacent curved portions continuous with said first surface, said casing having a liquid reservoir communicating with the rotor chamber and having two ports communicating respectively with the junctures of said cylindrical and curved surfaces and with the inner ends of said guideways, inwardly opening check valves in said passages, and means for controlling the circulation of fluid through the rotor chamber.

12. In a fluid transmission device, the combination of a tubular power shaft, a working shaft, a casing secured to the working shaft and having a rotor chamber therein, a rotor secured to the power shaft and rotating in said chamber, said rotor having outwardly extending guideways dividing it into sections, blades slidable in said guideways, the rotor sections having at both ends ports communicating with said tubular shaft, a piston valve in the tubular power shaft adapted to close said ports, said casing having a reservoir for the liquid and gas, said power shaft having holes communicating with the reservoir to permit the gas to escape.

13. In a fluid transmission device, the combination of a tubular power shaft, a working shaft, a casing secured to the working shaft and having a rotor chamber therein, a rotor secured to the power shaft and rotating in said chamber, said rotor having outwardly extending guideways dividing it into sections, blades slidable in said guideways, the rotor sections having at both ends ports communicating with said tubular shaft, a piston valve in the tubular power shaft adapted to close said ports, said casing having a reservoir for the liquid and gas communicating with the rotor chamber, said power shaft having holes communicating with the reservoir to permit gas to escape.

DEXTER C. BAKER.
GEO. H. DERRICK.
CONRAD D. PRUITT.